April 24, 1945.
H. A. WAGNER ET AL
2,374,398
CEMENT CONVEYING CAN
Filed June 30, 1941
2 Sheets-Sheet 1
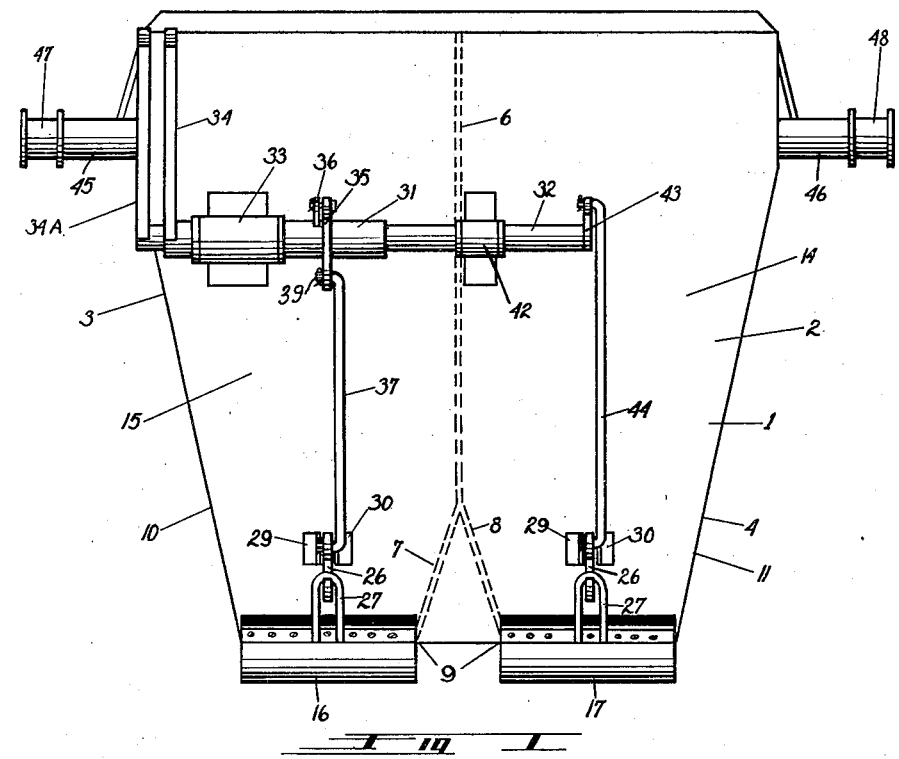
Fig. I
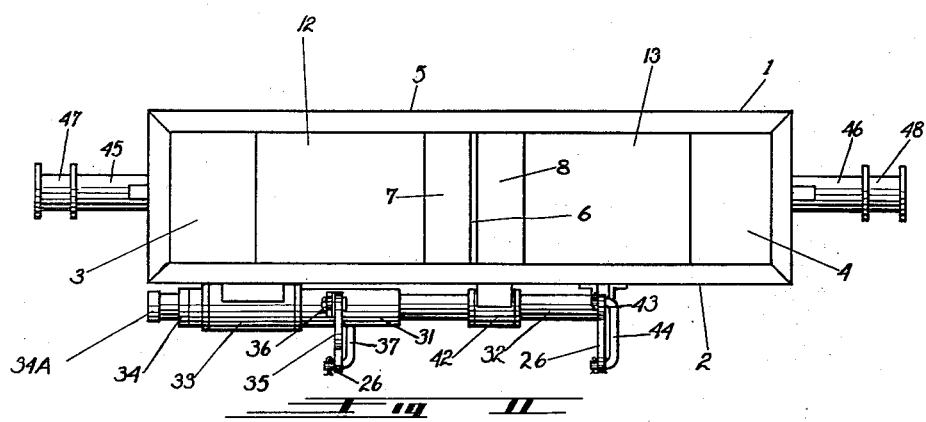
Fig. II
INVENTORS
HAROLD A. WAGNER
GUSTAVE H. WAGNER.
By E. A. Buckhorn
ATTORNEY April 24, 1945.　　H. A. WAGNER ET AL　　2,374,398
CEMENT CONVEYING CAN
Filed June 30, 1941　　2 Sheets-Sheet 2
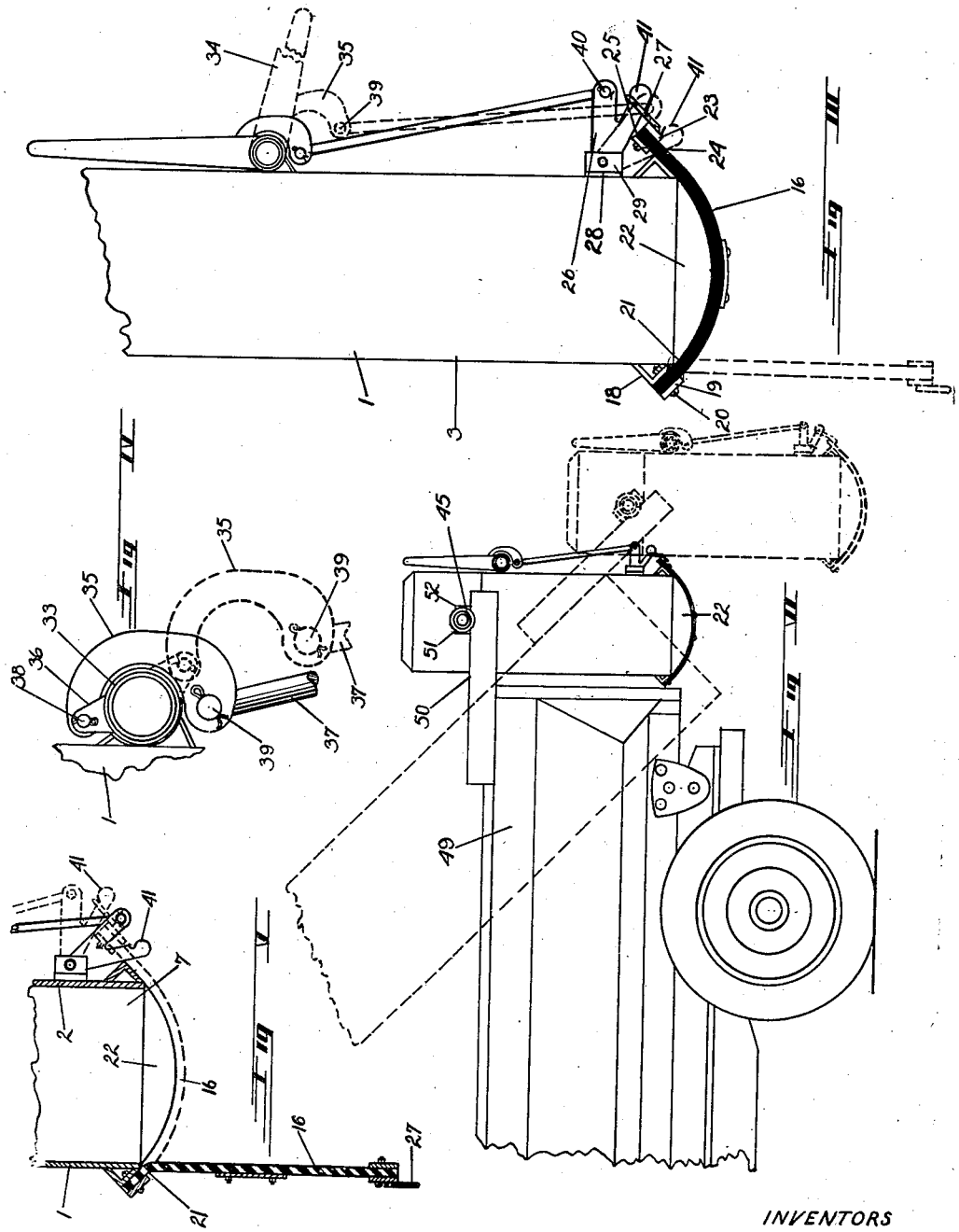
INVENTORS
HAROLD A. WAGNER,
GUSTAVE H. WAGNER
ATTORNEY Patented Apr. 24, 1945

2,374,398

UNITED STATES PATENT OFFICE 2,374,398

CEMENT CONVEYING CAN

Harold A. Wagner and Gustave H. Wagner, Portland, Oreg.

Application June 30, 1941, Serial No. 400,556

12 Claims. (Cl. 298—8)

This invention relates to containers, and more particularly to cement containers adapted to be mounted on the rear end of a dump truck of the type used for carrying sand, aggregate or the like.

For delivering bulk cement simultaneously with sand, gravel or the like, to be mixed at the construction site, it is desirable to provide separate containers therefor. Such containers may be so mounted on the truck that measured quantities of cement may be loaded therein at the time that sand or aggregate is loaded into the truck body. They may also be so designed that they may readily be unloaded at the site of delivery with a minimum of effort. However, such arrangements of the prior art are relatively cumbersome, expensive, and difficult to install on the ordinary dump truck.

It is a general object of the present invention to provide a cement container which may readily be mounted on the rear end of a dump truck of conventional design, and by means of which predetermined measured quantities of bulk cement may be transported with the sand or aggregate and unloaded at the site of delivery in a simple and efficient manner.

It is a further object of the invention to provide a new and improved bulk cement handling container mounted on the rear end of a dump truck in such a manner as not to consume any space within the truck body, and, furthermore, so that it may readily be removed from the truck when its use is not required.

A further object of the invention is to provide a new and improved dump truck mounting arrangement for a bulk cement handling container which functions in such a manner that when the truck is tilted for the unloading of the aggregates the discharge opening in the lower end of the cement container is lowered to substantially the ground level.

Another object of the invention is to provide a new and improved closure arrangement for discharge openings at the lower end of bulk cement handling containers.

A still further object of the invention is to provide a new and improved cement handling container adapted to be mounted on the rear end of a dump truck, which container is simple and compact in design, light in weight, and of low cost manufacture.

In accordance with an illustrated embodiment of the invention, the bulk cement handling container comprises a sheet metal box-like structure which is adapted to be mounted adjacent the rear end of a dump truck body. The supporting arrangement for the container comprises a pair of bracket arms secured to and extending rearwardly from the truck body preferably adjacent the uppermost edge thereof, and a pair of aligned shaft portions extending outwardly from the opposite sides of the container adjacent the uppermost end thereof and which are adapted to be cooperatively seated in suitable seats provided on the upper surface of the bracket arms. Due to the weight thereof the container will depend vertically downwardly from the pivotal support regardless of the tilted condition of the truck body. The container is provided with an open upper end for facilitating the loading thereof and with a discharge opening at the lowermost end which normally is covered by a novel closure means attached to and forming a part of the container. Because the pivotal support for the container is spaced somewhat rearwardly of the rear end of the truck body, when the truck body is tilted for dumping its contents the lower end of the container will swing outwardly relative to the truck so as not to interfere with the opening of the tail gate and the subsequent dumping of the sand or aggregate. Furthermore, the lowermost end of the cement container is automatically lowered to substantially the level of the upper surface of the pile of dumped sand or aggregate so that when the closure gate is opened the cement will flow smoothly from the container out over the aggregate with very little of it rising into the air.

Additional objects and advantages of the invention will appear from the following description, taken in connection with the accompanying drawings, while the features of novelty characterizing the invention will be pointed out with greater particularity in the appended claims.

In the drawings, Figure 1 is a front elevation of the cement handling container constructed in accordance with one form of the invention; Figure 2 is a plan view of the container shown in Figure 1, with the cover therefor removed; Figures 3, 4 and 5 are fragmentary views illustrating various details of the container closure means and latching arrangement therefor; and Figure 6 is a side view illustrating the cement handling container mounted on the rear end of a dump truck body.

Referring to the drawings, the cement handling container 1 is of a generally rectangular or box-like shape and, preferably, of sheet metal fabrication, comprising a front wall 2, side walls 3 and 4, and a back wall 5. A partition 6 extends downwardly within the container between the front and back walls, dividing the container into two separate, longitudinally vertical compartments. A pair of plates 7 and 8 are joined to the lower edge of the partition 6, somewhat above the bottom 9, and diverge downwardly away from each other. The lower ends 10 and 11 of the opposite side walls slope slightly toward each other so as to cooperate with the facing sloping partition plates 7 and 8 so as to define gradually tapering approaches for the discharge outlets 12 and 13 at the bottom of the respective compartments 15 and 14 of the container.

Closure means are provided for each of the discharge outlets 12 and 13 of the two compartments in the form of a pair of similar gates 16 and 17. Each closure gate is formed by a rectangular member of relatively heavy and flexible material such as a molded rubber-fabric composition and which is, furthermore, relatively resilient and compressible. The gates 16 and 17 are fastened along their rear edges by strap 19 and bolts 20 to one flange of an angle 18 secured as by welding along the lower edge of the rear wall 5 of the container and adjacent the rear edge of the discharge outlets.

Each of the discharge openings 12 and 13 for the lower ends of the container compartments are defined on the opposite ends by plates or wall portions 22 secured to and depending downwardly from the lower ends of the opposite side walls 2 and 3 and the intermediate partition plates 7 and 8. The plates 22 are arcuate at their lower end throughout the width of the discharge openings, providing curved seating edges for the opposite sides of the grates 16 and 17. Each of the gates is provided with a transverse stiffening member 21 to prevent the buckling thereof as the gate is drawn tightly to the closed position over the curved edges of plates 22, as shown in full line in Figure 3. The forward edges of the gates are each provided with metal reinforcing straps 23 and 24 on the opposite sides thereof to prevent fraying of the gate material. U-bolts 27 are fastened centrally to the outer reinforcing straps 23 and which are adapted to be engaged by latches 26 for holding the gates in the closed position. While the rear edge of the gates 16 and 17 are fixedly anchored relative to the containers, due to the inherent resilience of the material forming the gates they may flex downwardly, when unlatched, to the dotted line position shown in Figure 3 or to the position indicated in Figure 5 to permit the free flow of the contents from the respective container compartments.

The latches 26 are pivotally mounted as at 28 upon suitable mounting brackets 29 and 30 secured adjacent the lower ends of the container compartments as by welding. The latches 26 are adapted for individual control by a pair of manually operable levers 34 and 34A secured to adjacent ends of concentric shafts 31 and 32 which are in turn supported on the upper portion of the container in suitable bearings 33 and 42. The outer shaft 31 is provided with a short lug 36 extending outwardly from one side thereof and which is connected by pin 38 to link 35. Link 35 is connected by rod 37 to the latch 26 for gate 16, the opposite ends 39 and 40 of rod 37 extending through cooperating openings in link 35 and latch 26. The link 35 is semi-circular in shape, so that when the lever 34 is moved to its upper limit position the link will fit about one side of the shaft 31 and permit the line of tension to the latch 26 to be shifted past dead center for holding the gate 16 shut. The shaft 32 is provided with a lug 43 connected by link 44 to latch 26 for the gate 17. The gate 17, as in the case of gate 16, may be locked closed by moving lever 34A to the upper limit position and shifting the pull through lug 43 past dead center.

It will readily be seen that as the levers are moved to the upper limit positions, a strong pull is exerted against the U-bolts to draw the respective gates firmly against the edges of the various wall portions defining the discharge openings. A tight seal is thus formed about the discharge openings so as to prevent any leakage of the finely pulverized cement from the compartments. Upon movement of the respective manual control levers downwardly the latches are released and the U-bolts 27 may slide over the outer ends of the latch hooks 41, whereupon the flexible gates can flex downwardly under the weight of the cement within the container compartments and permit the cement to flow freely therefrom.

The upper surfaces of the gates 16 and 17, and particularly those portions thereof which engage with the edges about the discharge openings, being of rubber or the like material, will inherently remain relatively clean. Upon opening and closing of the gates, the flexing of the material will cause the loosening of any particles of cement which may tend to adhere to the surface. However, particles of sand or gravel remaining between the engaging surfaces about the discharge opening will merely be depressed into the gate material without destroying the tightness of the seal.

For mounting the container upon the rear end of a vehicle such as an aggregate dump truck, a pair of aligned stub shafts 45 and 46 are provided adjacent the uppermost end of the container so as to extend outwardly from the opposite side walls 3 and 2, respectively. A conventional dump truck body, indicated at 49 in Figure 6 may be provided with a pair of suitable bracket arms 50 extending rearwardly from the upper edge thereof and having suitable means defining the seating surfaces for the bearing portions 47 and 48 of the trunnion shafts attached to the container 1. As shown, a pair of spaced pins 51 and 52 may be provided on the upper surface of the brackets 50 for extending between the flange rings defining the bearing portions 47 and 48 of shafts 45 and 46, respectively. With this arrangement, the container may readily be lifted from the bracket arms when its use is not required, and the bracket arms 50, being relatively short, will not interfere with any other use to which the truck might be put.

Since the shafts 45 and 46 are freely rotatable relative to the bracket arms 50, and, further, since the horizontal axis of the trunnion support is through the upper portion of the container, the container will always assume a vertical position irrespective of the tilted condition of the truck body. This latter feature is important in connection with the unloading of the truck. In dotted lines in Figure 6 is illustrated the relative positions assumed by the container and the truck body during the tilted condition of the latter. In the normal position of the truck body, the container is supported relatively closely adjacent the truck tail gate and the lowermost end of the container is substantially even with the floor of the body. When the truck body is tilted for dumping, the container will continue to remain in the vertical position and the lower end thereof will swing outwardly with respect to the bottom edge of the truck body so that the container will not interfere with the opening of the tail gate and the flow of the sand, gravel, or aggregates from the truck body.

It will also be observed that in the tilted condition of the truck body the lowermost end of the cement container is lowered below the level of the truck body and to a point relatively closely above the surface of the ground. Thus, when one or the other of the gates 16 or 17 is opened, the cement may flow freely from the corresponding compartment with the creation of little or no dust. It will be understood that if the finely powdered cement is poured onto the ground from a considerable distance thereabove, it will splatter upon striking the ground surface and a substantial portion of the cement particles will rise up into the air. If the wind happens to be blowing at the time that the powdered cement is thus poured through the air, a considerable quantity of it will be blown away. With the container constructed and supported as described, the contents may readily be emptied with little or no loss during windy conditions.

The cement will usually be unloaded from the container substantially simultaneously with the unloading of the sand or aggregate from the truck body. In such an event, the sand or aggregate, in spreading out upon the ground, will flow under the lower end of the container and support the lower surface of the gates preventing a gate from opening wide. A sufficient opening will exist, however, to permit cement to escape from the desired compartment. If a wider gate opening is desired, the truck may be driven forward a slight amount, which will cause the container 1 to pivot about its trunnion support and, upon tilting of the lower end of the container relative to the surface of the sand or aggregate, the gate opening will be increased sufficiently to permit unrestricted discharge of the contents.

In the specific structure shown, the container is divided into two similar compartments, though it will be understood that the exact number of compartments may be varied as desired. The reason for the division of the container into compartments is that dump trucks for hauling sand, gravel and the like are frequently provided with transverse partitions so as to divide the load into predetermined measured portions which may be unloaded separately as desired, for example, into a mixer skip. The container is preferably provided with the same number of compartments as the dump truck body so that a measured quantity of cement can be discharged with each successive portion of sand or gravel which is unloaded from the truck.

Having described the principles of the invention in what is considered to be a preferred embodiment thereof, it is desired that it be understood that the specific details shown are merely illustrative, and that the invention may be carried out in other ways.

What we claim is:

1. In combination with a truck body adapted to be tilted upwardly at its forward end, bracket means extending rearwardly from the rear end of said body and a container mounted on said bracket means beyond the end of said body for pivotal movement about a horizontal axis extending transversely relative to said truck body.

2. In combination with a truck body adapted to be tilted upwardly at its forward end, bracket means extending rearwardly from the rear end of said body, a container pivotally mounted adjacent its upper end on said bracket means rearwardly of said truck body, a discharge opening in the lower end of said container, and closure means for said opening.

3. In combination with a truck body adapted to be tilted upwardly at its forward end, a container, means secured to said body for supporting said container for free pivotal movement about a horizontal axis adjacent its upper end, said axis extending transversely relative to said truck body and spaced rearwardly therefrom.

4. In combination with a truck body, bracket means extending rearwardly beyond the rear end of said truck body, a container supported on said bracket means and depending therefrom beyond said truck body, a pivotal means mounting said container on said bracket means for free pivotal movement about a horizontal axis, a discharge opening in the lower end of said container, and closure means for said discharge opening.

5. In combination with a tiltable truck body, a pair of arms extending rearwardly from the opposite sides beyond the rear end of said body, a container depending between said arms, and means pivotally supporting a pair of opposite sides of said container upon adjacent ones of said arms.

6. A bulk material handling means adapted to be mounted on the rear end of a truck body adapted to be tilted upwardly at its forward end, bracket means adapted to be secured to and extend rearwardly from the rear end of said body, a container mounted on said bracket means, a pivotal support for said container whereby it is free to depend vertically from said bracket means irrespective of the tilted position thereof, the pivotal support for said container on said bracket means being positioned whereby upon tilting of said bracket means the bottom of said container is lowered to a point relatively close to the ground.

7. A bulk material handling arrangement adapted to be mounted upon the rear end of a truck body adapted to be tilted upwardly at its forward end, bracket means adapted to be secured to and extend rearwardly from the rear end of said body, a container pivotally mounted adjacent its upper end on said bracket means, said container depending vertically downwardly from said bracket means, a discharge opening in the lower end of said container, closure means for said discharge opening, said container being supported on said bracket means so that upon tilting movement thereof the lower end of said container is dropped to a point relatively close to the ground.

8. A bulk cement handling container arrangement adapted for mounting on the rear end of an aggregate dump truck, bracket means adapted to be secured to the rear end of the truck body and extend rearwardly therefrom, said bulk cement container pivotally mounted adjacent its upper end on the outer ends of said bracket means, a vertical partitioning means in said container dividing said container into a plurality of compartments, a discharge opening in the lower end of each of said compartments, and independently operable closure means for each of said discharge openings.

9. A bulk material handling container adapted to be supported in a depending relation from the rear end of a truck, said container comprising a substantially rectangular sheet metal unit, vertical partitioning means dividing said container into a plurality of compartments, means defining a discharge opening at the bottom of each of said compartments, a closure means for each of said discharge openings, and lever means for releasably holding each of said closure means firmly against the edges of the corresponding discharge opening so as to effect a substantial seal therewith.

10. A bulk cement handling container adapted to be pivotally mounted upon the rear end of a dump truck, said container comprising a box like structure having partitions therein defining a plurality of longitudinally vertical compartments, a pair of bracket arms extending outwardly from a pair of opposite sides of said container adjacent the uppermost end thereof, means for supporting said bracket arms from which said container will depend longitudinally downwardly, a discharge opening at the bottom of each of said compartments, a closure means for each of said discharge openings, and lever means mounted on said container for individually controlling said closure means.

11. A cement handling container adapted for mounting on the rear end of a dump truck, said container being of a generally elongate shape, means for pivotally mounting said container adjacent the upper end thereof whereby said container will assume a longitudinally vertical position under force of gravity, means defining a discharge opening at the lowermost end of said container including a pair of spaced wall portions having curved lower edges, closure means for said discharge opening comprising a member of relatively flexible and resilient material having an area somewhat greater than said discharge opening, means securing said member along one side of said discharge opening between said wall portions, and lever means for engaging the opposite edge of said member and holding said member firmly against the curved edges of said wall portions so as to effect a substantially fluid tight seal therewith.

12. A bulk cement handling arrangement for mounting on the rear end of an aggregate hauling truck body, bracket means adapted to be secured to the end of the truck body and extend therebeyond, a container pivotally mounted adjacent its upper end on said bracket means, said container being readily liftable from said bracket means, a discharge opening on the lower end of said container, a closure means for said opening comprising a member of relatively flexible and resilient material adapted to engage with the edges of said opening to effect a substantial seal therewith.

HAROLD A. WAGNER.
GUSTAVE H. WAGNER.